United States Patent
Campagnolo

[11] Patent Number: 5,935,034
[45] Date of Patent: Aug. 10, 1999

[54] SPROCKET SUPPORTING UNIT FOR A BICYCLE

[75] Inventor: Valentino Campagnolo, Vicenza, Italy

[73] Assignee: Campagnolo S.r.l., Vicenza, Italy

[21] Appl. No.: 08/970,200

[22] Filed: Nov. 14, 1997

[30] Foreign Application Priority Data

Dec. 5, 1996 [IT] Italy .................................. TO96A0987

[51] Int. Cl.$^6$ .................................................. F16H 55/30
[52] U.S. Cl. .......................................................... 474/160
[58] Field of Search ..................................... 474/152, 160, 474/158, 162, 163, 164, 165, 903

[56] References Cited

U.S. PATENT DOCUMENTS

| | | | |
|---|---|---|---|
| 3,550,465 | 12/1970 | Maeda | 474/160 X |
| 4,106,357 | 8/1978 | Segawa | 474/160 |
| 5,213,550 | 5/1993 | Wu | 474/160 |
| 5,217,413 | 6/1993 | Nagano | 474/152 |
| 5,503,600 | 4/1996 | Berecz | 474/160 |
| 5,782,712 | 7/1998 | Campagnolo | 474/152 |

FOREIGN PATENT DOCUMENTS 892561  10/1953  Germany ................................ 474/160

*Primary Examiner*—Thomas R. Hannon
*Attorney, Agent, or Firm*—Sughrue, Mion, Zinn, Macpeak & Seas, PLLC

[57] ABSTRACT

A sprocket supporting unit for a bicycle comprises at least one intermediate supporting member which is mounted by a fluted coupling on the body of the free wheel associated with the hub of the bicycle rear wheel and which supports one or more sprockets.

8 Claims, 3 Drawing Sheets

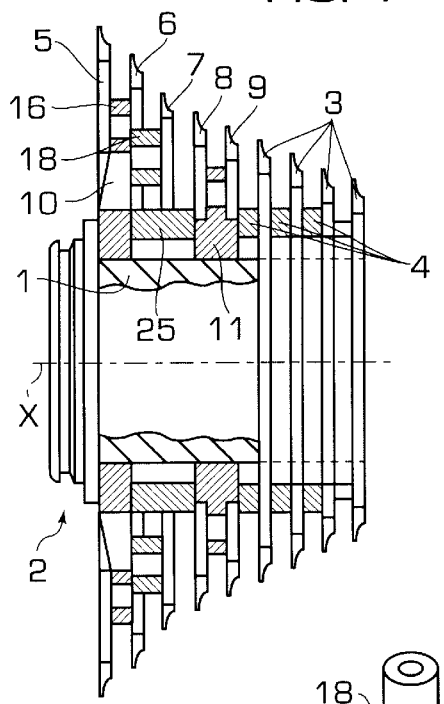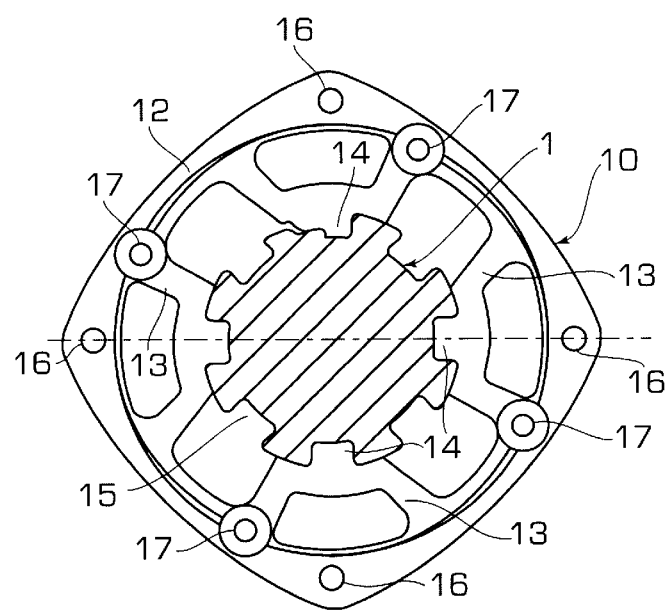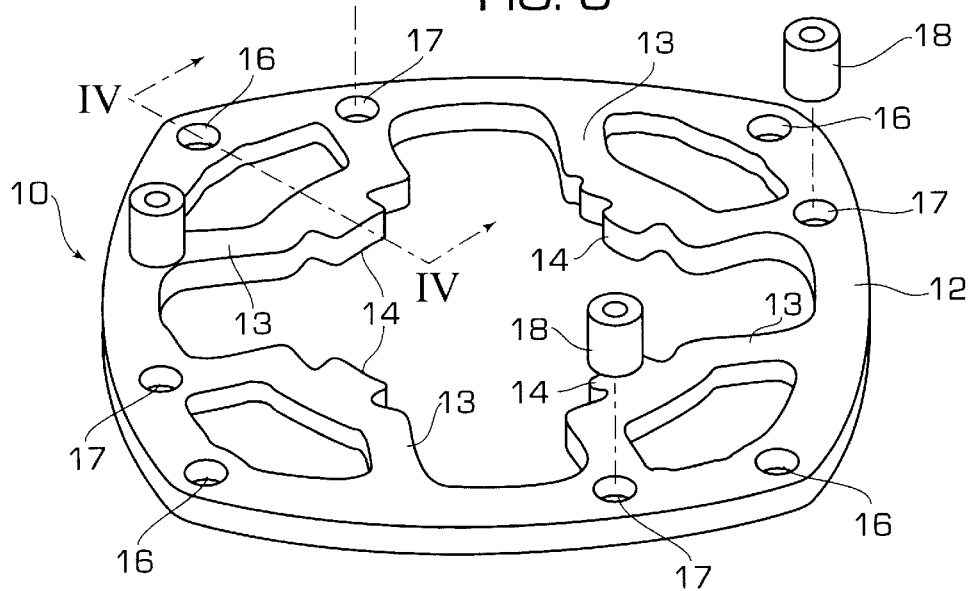

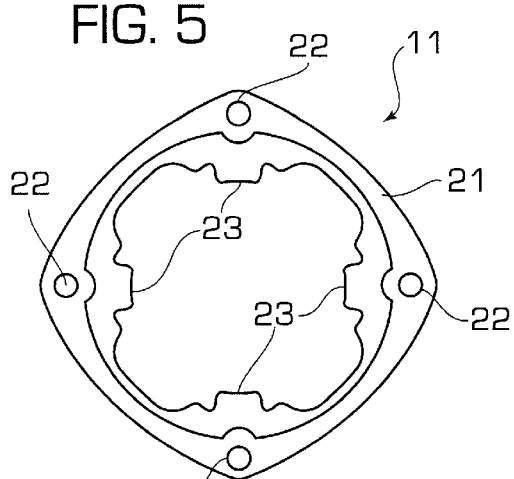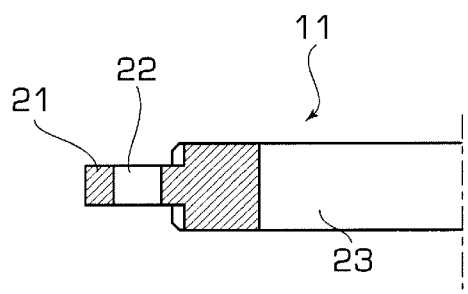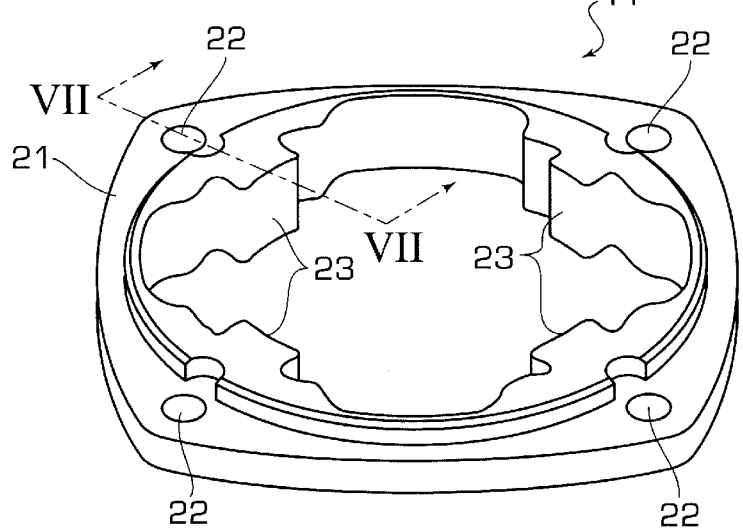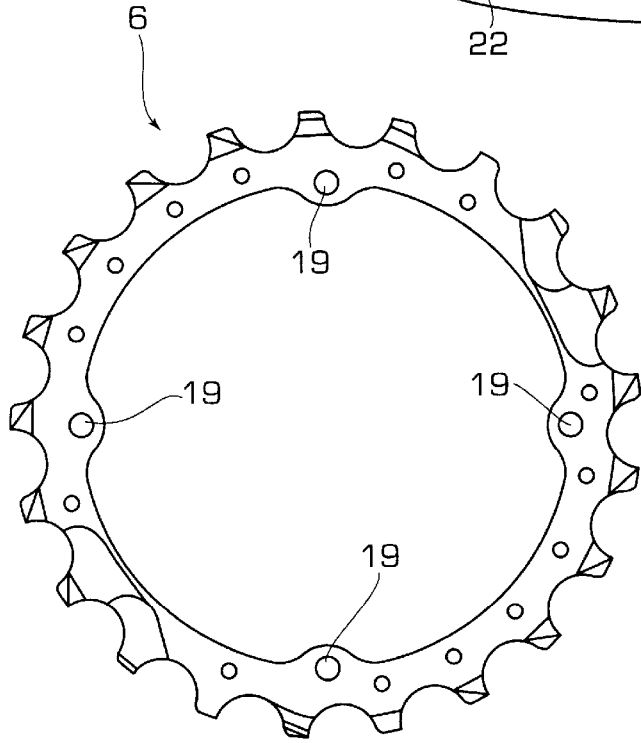

SPROCKET SUPPORTING UNIT FOR A BICYCLE

BACKGROUND OF THE INVENTION

The present invention relates to a unit for supporting a plurality of sprockets on a fluted cylindrical body associated with a hub of a bicycle rear wheel, of the type comprising at least one intermediate supporting member mounted on said cylindrical body by means of a fluted coupling and carrying on its turn at least one sprocket attached thereto by means of connecting elements.

A supporting unit of the above indicated type is disclosed for example in European Patent EP-B-0 510 371 and in the corresponding U.S. Pat. No. 5,194,051.

In this known solution, the above mentioned intermediate supporting body is constituted by a body of light alloy including a bush mounted by means of a fluted coupling on the aforesaid cylindrical body associated with the hub of the bicycle (this cylindrical body being typically the body of the free wheel associated with the hub) as a plurality of arms extending radially outwardly from the periphery of the aforesaid bush and inclined so as to lie on a common conical surface, these arms having stepped front surfaces having holes for engagement of screws for securing the sprockets.

Solutions of the above indicated type have been proposed in the endeavour to decrease the weight of the sprocket unit while rendering the operations for mounting the sprockets easier. However, solutions of this type have the drawback of being relatively complicated and expensive to manufacture.

SUMMARY OF THE INVENTION

The object of the invention is that of providing a sprocket supporting unit of the type indicated at the beginning of the present description by which the weight of the sprocket unit is greatly decreased with respect to the conventional solutions, while the operations for mounting the sprockets are particularly easy and rapid and a relatively simple and inexpensive structure is obtained.

In view of achieving this object, the invention provides a unit of the type indicated at the beginning of the present description, characterized in that the aforesaid intermediate supporting member comprises a peripheral annular crown and a profiled inner surface which is substantially coplanar with the peripheral annular crown and which is engaged on the aforesaid fluted cylindrical body, each sprocket being constituted by an annular plate attached to the aforesaid intermediate supporting member. The plate forming each sprocket may be provided with holes for engagement of elements for connection to a respective intermediate supporting member, and the aforesaid intermediate supporting member in this case is provided with cooperating holes for receiving the aforesaid connecting members. Alternatively, the plate forming each sprocket is provided with integral appendages adapted to be coupled with cooperating holes of the intermediate supporting member, or it is provided with holes adapted to be coupled with cooperating appendages formed in one piece with the intermediate supporting member. The plate forming each sprocket may be also rigidly connected to the intermediate supporting member as an insert, for example by injection-casting.

In a preferred embodiment, on the fluted cylindrical body of the free wheel associated with the hub of the rear wheel of the bicycle there are associated two intermediate supporting members for this sprockets. A first intermediate supporting member, which is for supporting the two sprockets with smaller diameter, is provided for supporting these sprockets at its two opposite faces, exploiting holes for common connecting elements. A second intermediate supporting member supports three sprockets of greater diameter, two of these sprockets being supported on the two opposite faces of this intermediate supporting member, exploiting holes which are engaged by common connecting elements. A third sprocket is supported on one of the two faces of the intermediate supporting member, exploiting a second series of holes, which are arranged at a position closer to the central axis of the unit, with respect to the holes of the first series.

Naturally, it is possible to provide also for a different number of intermediate supporting members. It is further possible to provide for many sprockets to be fixed to a same face of an intermediate supporting member, exploiting the same holes for the connection and providing also spacer bushes between each sprocket and the other.

Due to the above indicated features, the unit according to the invention enables the weight of the structure to be greatly reduced with respect to the conventional solutions, while the operations for mounting these sprockets can be carried out particularly rapidly and easily.

BRIEF DESCRIPTION OF THE DRAWINGS

The invention will be now described with reference to the annexed drawings, given purely by way of non limiting example, in which:

FIG. 1 is a cross-sectional view of a sprocket supporting unit according to the invention, FIG. 2 is a front view of a first intermediate supporting member forming part of the unit of FIG. 1, FIG. 3 is a perspective view of the intermediate supporting member of FIG. 2, FIG. 4 is a cross-sectional view taken along line IV—IV of FIG. 3, FIG. 5 is a front view of a further intermediate supporting member forming part of the unit of FIG. 1, FIG. 6 is a perspective view of the intermediate supporting member of FIG. 5, FIG. 7 is a view in cross-section taken along line VII—VII of FIG. 6, FIGS. 8–10 are front views of the three sprockets which are mounted on the intermediate supporting member of FIG. 2, and FIGS. 11, 12 are front views of the two sprockets which are mounted on the intermediate supporting member of FIG. 5.

DETAILED DESCRIPTION OF THE INVENTION

Figure 8:
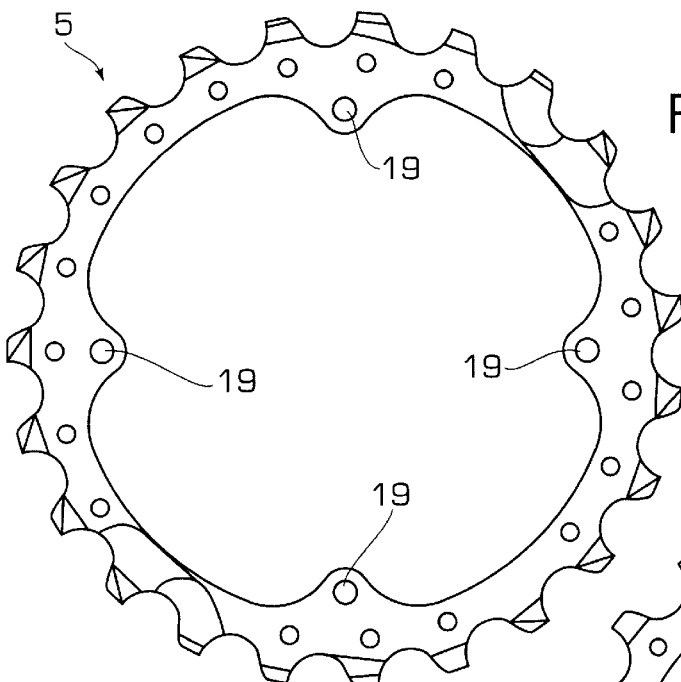
Figure 11:
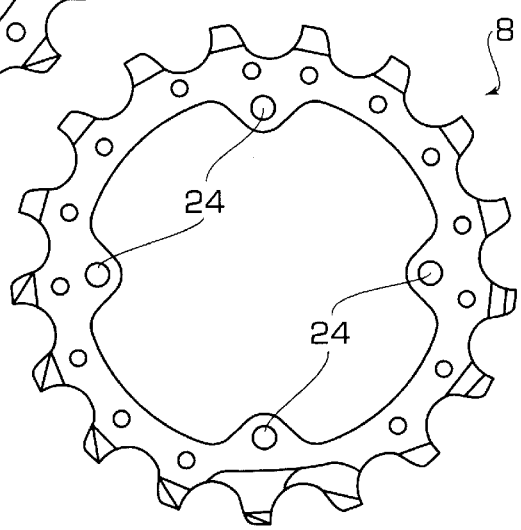

With reference to FIG. 1, numeral 1 generally designates the body of the free wheel associated, in a way known per se, with the hub of the bicycle rear wheel. The structure and arrangement of hub 2, as well as free wheel 1, is not described herein in detail, since they may be provided in any known way and do not fall, taken alone, within the scope of the present invention. Furthermore, the deletion of these details from the drawings renders the latter simpler and easier to understand.

According to a technique known per se, the body 1 of the free wheel has a fluted cylindrical surface serving for mounting the sprockets which are to be engaged by the bicycle transmission chain.

The illustrated example relates to a case in which nine different sprockets are associated with the hub of the bicycle rear wheel, but it is clearly apparent that the invention is of general application to any number of sprockets.

First of all, yet in the case of the illustrated example, the four sprockets with the smallest diameters, all designated by reference numeral 3, are mounted on body 1 of the free wheel in a conventional way. This means that each of the sprockets 3 is mounted by means of a fluted coupling directly on body 1, with the interposition of spacer rings 4. The five sprockets with greater diameter, respectively designated by 5, 6, 7, 8, 9, are instead mounted on body 1 of the free wheel with the interposition of two intermediate supporting members 10, 11.

Figure 10:
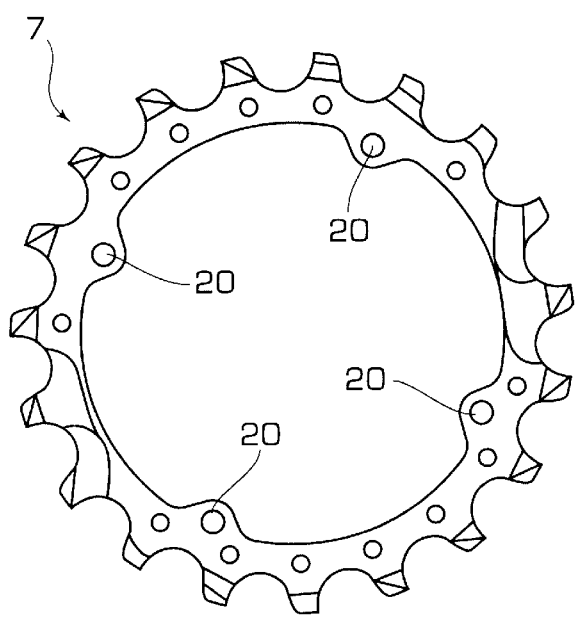
Figure 12:
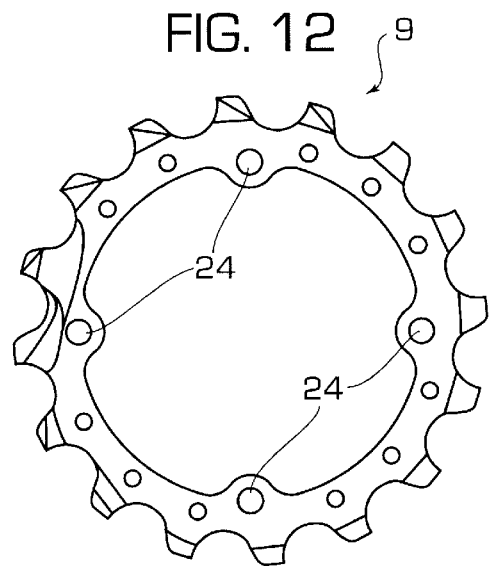

The intermediate supporting member 10 is shown in FIGS. 2–4. This member is constituted by a substantially planar plate preferably made of light alloy or a polymer-based composite material, comprising a peripheral annular crown 12 and a plurality of spokes 13 projecting radially inwardly from the annular crown 12. In the illustrated example, the free wheel body has eight longitudinal slots equiangularly spaced from each other, while the annular crown 12 is provided with four spokes ending at their free ends with a same number of teeth 14 which engage slots 15 of body 1, which are equiangularly spaced from each other. This arrangement provides a great saving in weight with respect to the case in which plate 10 were provided with eight inner teeth 14 for engaging all the slots of body 1. It is however possible to provide a member 10 with any type of profiled inner surface adapted to engage the fluted body 1. As it is clearly shown also in FIGS. 1, 3 and 4, the intermediate supporting body 10 has a first series of four holes 16, arranged at a greater distance with respect to the central axis of the unit, designated by X, and a second series of four holes 17, arranged at a lower radius and located close to four spacer bushes 18 (which might also be obtained in one piece with plate 10). Consequently, the two sprockets 5, 6 with greater diameter are constituted by annular plates (see FIGS. 8, 9) each having four holes 19 located at a radius corresponding to that of holes 16 of the intermediate supporting member 10. The sprocket 7 ( FIG. 10) is also constituted by an annular plate, with a series of four holes 20 arranged at a radius corresponding to that of holes 17 of the intermediate supporting member 10. Due to this arrangement, the two sprockets 5, 6 may be secured to the two opposite faces of the intermediate supporting member 10, as shown in FIG. 1, exploiting holes 19 of the sprockets 5, 6 and holes 16 of the intermediate supporting member 10, which receive common connecting elements, such as rivets. The sprocket 7 is instead mounted (also as shown in FIG. 1) on the front surfaces of the four bushes 18, which therefore act as spacer elements, exploiting the connecting elements which engage the holes 20 of sprockets 7 and holes 17 of intermediate supporting member 10. With reference to FIGS. 5–7, the intermediate supporting member 11 is similar in principle to the intermediate supporting member 10, since it also has an annular crown 21 having four holes 22 for engagement of connecting elements, and four spokes, of a very reduced length, extending radially inwardly from the peripheral crown 2 and ending with four teeth 23 which engage a same number of slots 15 of body 1 which are equiangularly spaced from each other. The two sprockets 8, 9 each have four holes 24 at a radius corresponding to that of holes 22, so that the intermediate supporting member 11 may be used for mounting the two sprockets 8, 9 on the two opposite faces thereof, exploiting common connecting elements which engage holes 22 and 24 of the intermediate supporting member 11 and the two sprockets 8, 9. As shown in FIG. 1, also between the two intermediate supporting members 10, 11 there is interposed a spacer ring 25. With reference to FIG. 7, the example described herein has a plate 11 with a reduced thickness at its periphery. It is however clearly apparent that the shape of plate 11 might be also different, for example it might have a uniform thickness of any other configuration.

Due to the above described features, the sprocket supporting unit according to the invention provides a great reduction in weight with respect to the conventional solutions and renders the operation for mounting the sprockets particularly simple and easy. At the same time, the structure is relatively simple and inexpensive to manufacture.

Naturally, while the principle of the invention remains the same, the details of construction and the embodiments may widely vary with respect to what has been described and illustrated purely by way of example, without departing from the scope of the present invention.

What is claimed is:

1. Unit for supporting a plurality of sprockets on a fluted cylindrical body associated with a hub of a bicycle rear wheel, comprising at least one intermediate supporting member mounted on said cylindrical body by means of a fluted coupling and carrying at least one sprocket attached thereto by means of connecting elements, wherein said intermediate supporting member comprises a peripheral annular crown and a profiled inner surface which is substantially coplanar with the peripheral annular crown and which is engaged on said fluted cylindrical body, each sprocket being constituted by an annular plate secured to said intermediate supporting member.

2. Sprocket supporting unit according to claim 1, wherein the plate constituting each sprocket is provided with holes for engagement of connecting elements for connection to a respective intermediate supporting member and said intermediate supporting member is provided with respective holes for receiving said connecting elements.

3. Sprocket supporting unit according to claim 1, wherein it comprises at least a first intermediate supporting member and a second intermediate supporting member for mounting respective sprockets.

4. Sprocket supporting unit according to claim 3, wherein said second intermediate supporting member comprises a single series of holes for engagement of common connecting elements for the two respective sprockets on the two opposite faces of said intermediate supporting member.

5. Sprocket supporting unit according to claim 3, wherein said first intermediate supporting member comprises a first series of holes for engagement of common connecting elements for connection of one or more respective sprockets on at least one of the two opposite faces of said intermediate supporting member, and a second series of holes arranged at a lower radius with respect to the holes of the first series for engagement of connecting elements for connecting a third sprocket.

6. Sprocket supporting unit according to claim 5, wherein said first intermediate supporting member has a plurality of spokes projecting radially inwardly from the peripheral annular crown, said spokes having inner ends which engage at least part of the longitudinal slots provided on said cylindrical body.

7. Sprockets supporting unit according to claim 6, wherein each of said spokes is provided with an aperture for reduction of weight.

8. Sprocket supporting unit according to claim 6, wherein each of said spokes ends with a tooth engaging a cooperating slot of the fluted body, only one half of said slots being engaged by said spokes, so that the inner profile of said intermediate supporting member has a notch between each spoke and the other for reduction of weight.

* * * * *